(12) United States Patent
Li et al.

(10) Patent No.: US 10,795,050 B2
(45) Date of Patent: Oct. 6, 2020

(54) VEHICLE DETECTION SYSTEM

(71) Applicants: TSINGHUA UNIVERSITY, Beijing (CN); Nuctech Company Limited, Beijing (CN)

(72) Inventors: Ying Li, Beijing (CN); Jianmin Li, Beijing (CN); Jinguo Cao, Beijing (CN); Yuan Ma, Beijing (CN); Yulan Li, Beijing (CN); Yuan He, Beijing (CN); Yuanjing Li, Beijing (CN); Hui Meng, Beijing (CN); Zhiqiang Chen, Beijing (CN); Yiwei Guo, Beijing (CN); Li Zhang, Beijing (CN)

(73) Assignees: TSINGHUA UNIVERSITY, Beijing (CN); NUTECH COMPANY LIMITED, Beijing (CN)

( * ) Notice: Subject to any disclaimer, the term of this patent is extended or adjusted under 35 U.S.C. 154(b) by 0 days.

(21) Appl. No.: 16/233,387

(22) Filed: Dec. 27, 2018

(65) Prior Publication Data
US 2019/0196050 A1 Jun. 27, 2019

(30) Foreign Application Priority Data
Dec. 27, 2017 (CN) .......................... 2017 1 1444399

(51) Int. Cl.
*G01V 5/00* (2006.01)
*G06K 9/00* (2006.01)

(52) U.S. Cl.
CPC ............ *G01V 5/005* (2013.01); *G01V 5/0016* (2013.01); *G06K 9/00832* (2013.01)

(58) Field of Classification Search
CPC .. G01V 5/0008; G01V 5/0016; G01V 5/0066; G01V 5/005; G06K 9/00355
See application file for complete search history.

(56) References Cited

U.S. PATENT DOCUMENTS

| 7,742,568 B2* | 6/2010 | Smith | G01N 23/087 378/57 |
| 2004/0017887 A1* | 1/2004 | Le | G01N 23/04 378/57 |

(Continued)

FOREIGN PATENT DOCUMENTS

| CN | 1962102 A | 5/2007 |
| CN | 104502377 A | 4/2015 |

(Continued)

OTHER PUBLICATIONS

Extended European Search Report dated Apr. 17, 2019 received in European Patent Application No. 18 30 6880.8.

*Primary Examiner* — David P Porta
*Assistant Examiner* — Fani Boosalis
(74) *Attorney, Agent, or Firm* — Scully Scott Murphy & Presser (57) ABSTRACT

A vehicle detection system includes a transverse detector arm, two vertical detector arms, a radiation source, a plurality of transverse detectors, and a plurality of vertical detectors. The transverse detector arm may be disposed on the ground. Two vertical detector arms are disposed at both ends of the transverse detector arm. The radiation source is located above the transverse detector arm. A plurality of transverse detectors are disposed within the transverse detector arm and are laid along a length direction of the transverse detector arm for receiving ray emitted by the radiation source. The plurality of vertical detectors are symmetrically disposed on the two vertical detector arms, and each of the vertical detectors is disposed towards a center point of the radiation source for receiving ray emitted by the radiation source.

20 Claims, 4 Drawing Sheets

(56) References Cited

U.S. PATENT DOCUMENTS

| | | | |
|---|---|---|---|
| 2008/0292050 A1* | 11/2008 | Goodenough | G01V 5/005 |
| | | | 378/57 |
| 2009/0086907 A1 | 4/2009 | Smith | |
| 2015/0168589 A1 | 6/2015 | Morton et al. | |
| 2016/0054470 A1* | 2/2016 | Hu | F16M 13/02 |
| | | | 378/57 |

FOREIGN PATENT DOCUMENTS

| | | |
|---|---|---|
| CN | 105242322 A | 1/2016 |
| CN | 105346975 A | 2/2016 |
| CN | 105393111 A | 3/2016 |
| CN | 106185226 A | 12/2016 |
| CN | 106908851 A | 6/2017 |
| CN | 107490805 A | 12/2017 |
| CN | 108037542 A | 5/2018 |
| CN | 207817228 U | 9/2018 |

* cited by examiner

VEHICLE DETECTION SYSTEM

CROSS REFERENCE

This application is based upon and claims priority to Chinese Patent Application No. 201711444399.2, filed on Dec. 27, 2017, the entire contents thereof are incorporated herein by reference.

TECHNICAL FIELD

The present disclosure relates to a vehicle detection system.

BACKGROUND

At present, vehicle detection systems have been widely used in airports, stations, wharfs, etc. The radiation imaging technology is used to detect interior of the vehicle and obtain an image of the interior of the vehicle, so as to check whether there are prohibited goods. In the existing vehicle inspection system, the vehicle detection system using top view imaging is widely used.

The existing vehicle detection system with top view imaging generally includes a radiation source and a transverse detector arm buried in the ground. The radiation source is disposed above the transverse detector arm and may emit rays such as X-rays or y-rays that can penetrate through the vehicle. A plurality of detectors may be disposed on the transverse detector arm and arranged in a centripetal manner, so that the detectors are disposed towards the radiation source and arranged in an arc shape. During passage of the vehicle through the transverse detector arm, the detector may receive ray from the radiation source to form an image of the interior of the vehicle.

The above information disclosed in this background section is only intended to enhance understanding of the background of the present disclosure, and thus it may include information that does not constitute the prior art known to those of ordinary skill in the art.

SUMMARY

In accordance with one aspect of the present disclosure, a vehicle detection system includes a transverse detector arm, two vertical detector arms, a radiation source, a plurality of transverse detectors, and a plurality of vertical detectors. The transverse detector arm may be disposed on the ground. The two vertical detector arms are disposed at both ends of the transverse detector arm. The radiation source is located above the transverse detector arm. The plurality of transverse detectors are disposed within the transverse detector arm and laid along a length direction of the transverse detector arm for receiving ray emitted by the radiation source. The plurality of the vertical detectors are symmetrically disposed on the two vertical detector arms, and each of the vertical detectors is disposed towards a center point of the radiation source for receiving ray emitted by the radiation source.

According to an embodiment of the present disclosure, the transverse detector arm is laid on the ground.

According to an embodiment of the present disclosure, a midperpendicular plane of the transverse detector arm passes through the center point of the radiation source.

According to an embodiment of the present disclosure, midperpendiculars of the vertical detectors intersect at the center point of the radiation source.

According to an embodiment of the present disclosure, the transverse detector arm includes a casing and a mounting plate. The casing presents a tubular structure, and has a first end and a second end. The mounting plate is horizontally disposed within the casing and may move in or out along a length direction of the casing, and the transverse detector is disposed on the mounting plate.

According to an embodiment of the present disclosure, the transverse detector arm further includes a first end cover and a second end cover. The first end cover is detachably connected to the first end. The second end cover is detachably connected to the second end.

According to an embodiment of the present disclosure, the transverse detector arm further includes a first sealing ring and a second sealing ring. The first sealing ring is disposed at an end surface of the first end or the first end cover for sealingly connecting the first end cover with the first end. The second sealing ring is disposed at an end surface of the second end or the second end cover for sealingly connecting the second end cover with the second end.

According to an embodiment of the present disclosure, the casing includes a lower casing and an upper casing each having a U-shaped cross section, and the upper casing and the lower casing are oppositely engaged and sealingly connected.

According to an embodiment of the present disclosure, the casing is provided with a plurality of outwardly extending connecting lugs, and each of the connecting lugs is provided with a mounting hole.

According to an embodiment of the present disclosure, the mounting plate includes a first mounting assembly and a second mounting assembly. The first mounting assembly is disposed within the casing and may move in or out of the first end. The second mounting assembly is disposed within the casing and directly faces the first mounting assembly, and may move in or out of the second end. The first mounting assembly and the second mounting assembly are each provided with the transverse detector.

According to an embodiment of the present disclosure, the first mounting assembly includes a first bottom plate and a first supporting plate detachably connected to the first bottom plate; the second mounting assembly includes a second bottom plate and a second supporting plate detachably connected to a second bottom plate; the first supporting plate and the second supporting plate are each provided with the transverse detector.

According to an embodiment of the present disclosure, the mounting plate includes a first mounting assembly and a second mounting assembly. The first mounting assembly is disposed within the casing and may move in or out of the first end, and the first end cover is connected to one end of the first mounting assembly. The second mounting assembly is disposed within the casing and directly faces the first mounting assembly, and may move in or out of the second end. The second end cover is connected to one end of the second mounting assembly. The first mounting assembly and the second mounting assembly are each provided with the transverse detector.

BRIEF DESCRIPTION OF THE DRAWINGS

The above and other features and advantages of the present disclosure will become more apparent from the detailed description of the exemplary embodiments with reference to the accompanying drawings.

In the figures: 1: transverse detector arm; 11: casing; 111: lower casing; 112: upper casing; 1121: connecting lug; 12: first mounting assembly; 13: second mounting assembly; 14: first end cover; 15: second end cover; 16: first sealing ring; 17: second sealing ring; 2: vertical detector arm; 3: radiation source; 4: transverse detector; 5: vertical detector; 6: top beam; 7: joint; 8: vehicle.

DETAILED DESCRIPTION

Example embodiments will now be described more fully with reference to the accompanying drawings. However, the example embodiments can be embodied in a variety of forms, and should not be construed as being limited to the embodiments set forth herein; rather, these embodiments are provided so that this disclosure will be thorough and complete, and the concepts of the example embodiments will be fully given to those skilled in the art. The same reference numerals in the drawings denote the same or similar structures, and thus their detailed descriptions will be omitted.

Although the relative terms such as "on", "below", "upper" and "lower" are used in the specification to describe the relative relationship of one component to another component, these terms are used in this specification for convenience only, for example, a direction in the example according to the accompanying drawings. It should be understood that if the device is turned upside down, the "upper" component described above will become a "lower" component. Other relative terms such as "top", "bottom", "horizontal" and "vertical" also have similar meanings. When a structure is "on" another structure, it is possible that the structure is integrally formed on another structure, or that the structure is "directly" disposed on another structure, or that the structure is "indirectly" disposed on the other structure through other structures.

The terms such as "a", "an", "the" and "said" are used to indicate the presence of one or more elements/components; the terms "comprise", "include", "have", "contain" and their variants are used to be open-type and are meant to include additional elements/components, etc., in addition to the listed elements/components/etc.; the terms "first", "second", etc. are used only as marks, rather than limitation for the number of objects.

In the existing transverse detector arm, in order to meet requirements of the centripetal arrangement of the detector, a plurality of detectors are arranged in an arc shape, so that a thickness of the transverse detector arm is relatively large, and a vehicle, especially a small vehicle, is difficult to pass through. Therefore, it is necessary to perform a large amount of construction work at an installation site so as to form a trench on the ground for burying the transverse detector arm, and thus the transverse detector arm was buried in the ground.

In the vehicle detection system of the present disclosure, a plurality of transverse detectors 4 are laid in the transverse detector arm 1 and arranged in a straight line instead of an arc shape. It has been verified that the arrangement of laying such a transverse detector 4 in the transverse detector arm 1 is sufficient to achieve detection effect. In the present disclosure, a thickness of the transverse detector arm 1 in the vertical direction is thin, so that the vehicle to be detected can easily pass the transverse detector arm 1.

Figure 1:
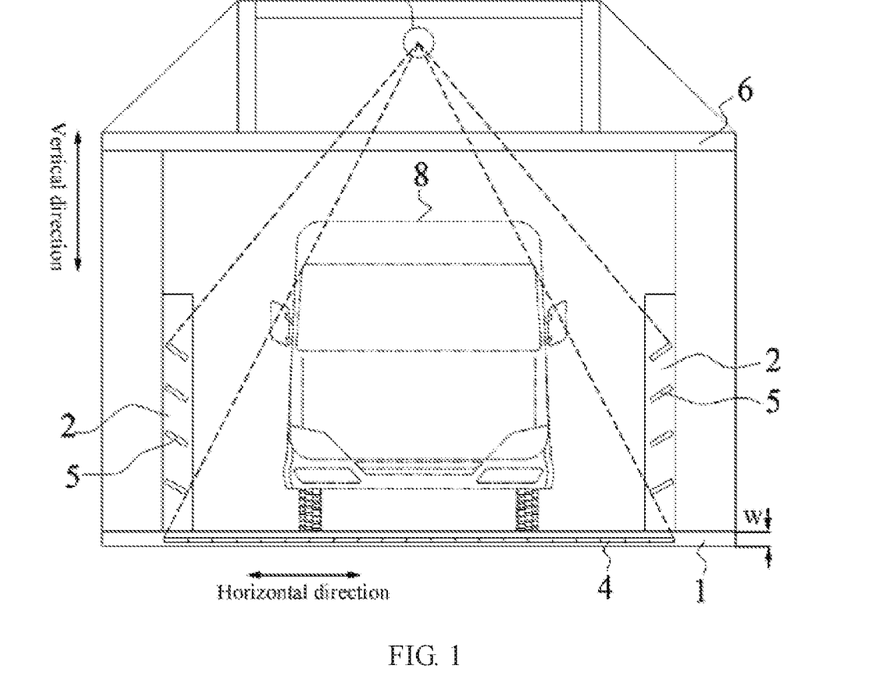
FIG. 1 is a schematic view of an embodiment of a vehicle detection system of the present disclosure.

A vehicle detection system for detecting a vehicle 8 is provided in the present exemplary embodiment. As shown in FIG. 1, the vehicle detection system may include a transverse detector arm 1, a vertical detector arm 2, a radiation source 3, a transverse detector 4, and a vertical detector 5. The transverse detector arm 1 refers to an arm which is disposed on the ground for mounting the detector; and the vertical detector arm 2 refers to an arm which is close to the ground at one end and away from the ground at the other end to mount the detector. The vertical detector arm 2 may be substantially perpendicular to the transverse detector arm 1. The transverse detector 4 refers to a detector mounted on the transverse detector arm 1, and the vertical detector 5 refers to a detector mounted on the vertical detector arm 2. The detector may present the existing structure, and the existing detector has a mounting surface which may be mounted on a detector arm. For example, the existing detector has a substantially rectangular parallelepiped shape in which one surface is the mounting surface.

In the vehicle detection system of the present disclosure, a plurality of transverse detectors 4 are laid within the transverse detector arm 1, i.e., each angle between the mounting surface of each of the transverse detectors 4 and the mounting surface of the transverse detector arm 1 is 0 degree regardless of the installation error. That is to say, when the transverse detector arm 1 is horizontally mounted (the mounting surface of the transverse detector arm 1 is horizontal), an angle between the mounting surface of the transverse detector arm 1 and the horizontal plane is 0 degree, and an angle between each of the transverse detectors 4 and the horizontal plane is also 0 degree. Therefore, a thickness W of the transverse detector arm 1 in the present disclosure is thinner in the vertical direction, and the transverse detector arm 1 is laid on the ground surface, so that the vehicle to be detected may pass easily; in addition, a small amount of construction work may be performed to dug a shallow groove, the transverse detector arm 1 and related components are buried to be flush with the ground surface or buried below the ground surface, so that the vehicle to be detected may pass without barrier.

Figure 2:
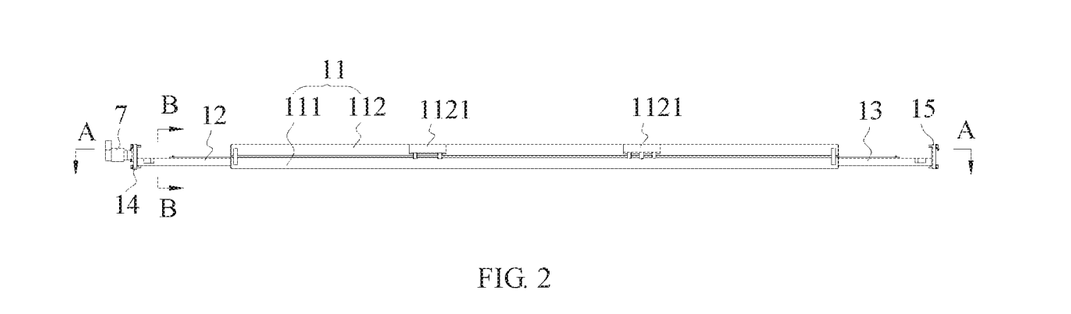
FIG. 2 is a front view of an embodiment of a transverse detector arm of the vehicle detection system of the present disclosure.

As shown in FIG. 2, in an embodiment, the transverse detector arm 1 may include a casing 11 and a mounting plate, wherein:

The casing 11 may be a tubular structure having two ends penetrated therethrough. These ends are respectively a first end 115 and a second end 116, and the mounting plate may be accommodated in the casing 11. The shape of the cross section of the casing 11 may be rectangular or circular, which is not limited thereto, and may also be trapezoidal or other shapes. The cross section is a section perpendicular to an axial direction of the casing 11. The casing 11 may be partially embedded in the ground or directly fixed on the ground surface through which the vehicle 8 may pass.

Figure 5:
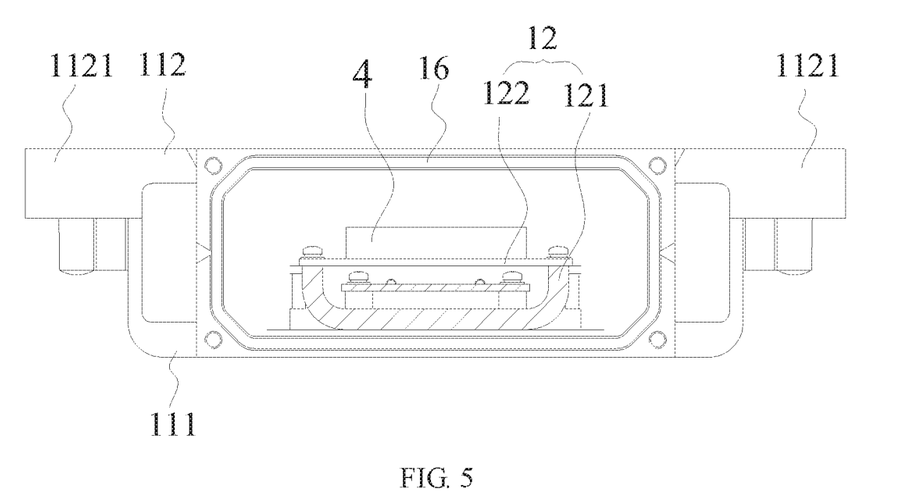
FIG. 5 is a cross-sectional view taken along line B-B of FIG. 2.

The casing 11 may be an integrated tubular structure or a spliced tubular structure. For example, as shown in FIGS. 2 and 5, the casing 11 may include a lower casing 111 and an upper casing 112. The lower casing 111 may have a U-shaped cross section with its opening facing upwards. The upper casing 112 may also have a U-shaped cross section, and the opening direction thereof is opposite to that of the lower casing 111 so as to be capped on the lower casing 111, so that the upper casing and the lower casing 111 are cooperated to be enclosed as the casing 11. At the same time, the upper casing 112 may be sealingly connected with the lower casing 111 by welding, snapping or by bolting or the like. In other embodiments of the present disclosure, the lower casing 111 has a U-shaped cross section, and the upper casing 112 may be a flat plate structure. The upper casing 112 may also be enclosed as a tubular structure, i.e., the casing 11, combined with the lower casing 111 after the upper casing 112 is capped on the lower casing 111. Of course, the lower casing 111 and the upper casing 112 may be other structures as long as they can be spliced into the casing 11 of a tubular structure, which will not be listed herein.

Figure 3:
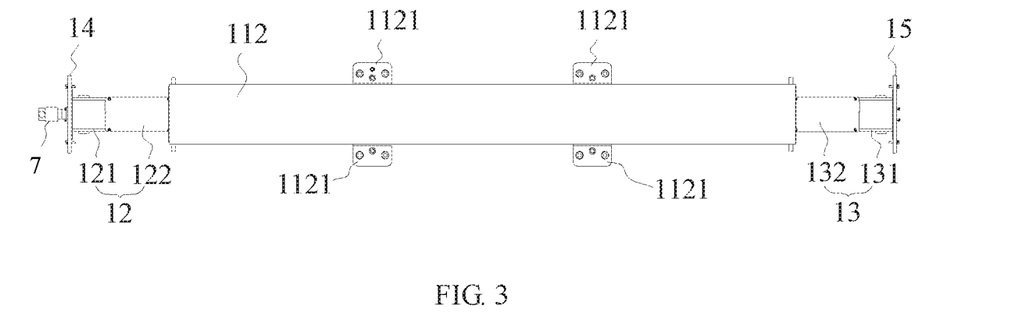
FIG. 3 is a top view of the transverse detector arm of FIG. 2.

In addition, as shown in FIG. 3, a connecting lug 1121 may be provided on the upper casing 112 and may extend outwards, i.e., extend away from the upper casing 112. The number of connecting lugs 1121 may be plural and symmetrically distributed at both sides of the upper casing 112. At the same time, the connecting lug 1121 and the upper casing 112 may be integrated structures, and may also be fixedly connected by welding, riveting or by screw connection or the like. In addition, the connecting lug 1121 may be provided with a mounting hole, which may be a threaded hole or an unthreaded hole, and the connecting lug 1121 may be fixedly connected to the ground by a screw connection such as a foundation bolt. Of course, the connecting lug 1121 may also be disposed on the lower casing 111 as long as it can be used to fix the casing 11 to the ground.

Figure 4:
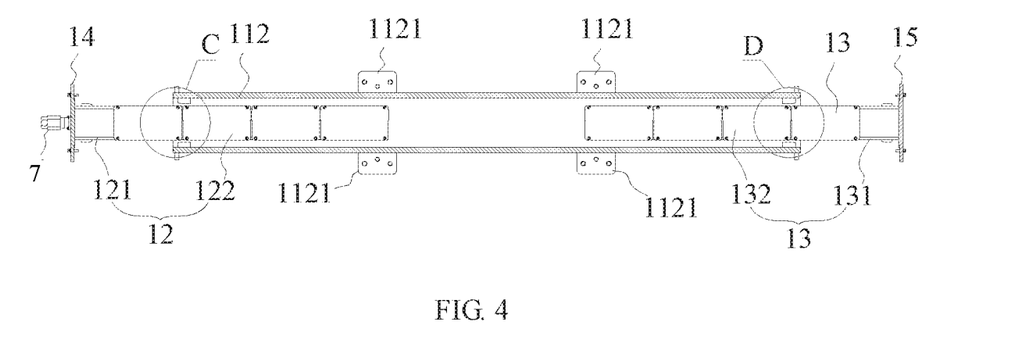
FIG. 4 is a cross-sectional view taken along line A-A of FIG. 2.

As shown in FIG. 4, the mounting plate may be a flat plate structure, and may be disposed within the casing 11 and capable of moving in or out of the casing 11 along a length direction of the casing 11. The transverse detector 4 is laid on the mounting plate. For example, the transverse detector 4 has a rectangular parallelepiped structure, and each of transverse detectors 4 has a surface attached to the upper surface of the mounting plate and fixedly connected.

The number of mounting plates may be one. The mounting plate may be disposed within the casing 11 and may enter/exit the casing 11 from the first end 115 or the second end 116 of the casing 11 to facilitate to overhaul the transverse detector 4 on the mounting plate. Alternatively, as shown in FIG. 4, the number of mounting plates may also be two, including a first mounting assembly 12 and a second mounting assembly 13, wherein:

As shown in FIG. 5, a plurality of transverse detectors 4 may be mounted on the first mounting assembly 12 and may move in or out of the casing 11 from the first end 115 of the casing 11. For example, the first mounting assembly 12 may include a first bottom plate 121 and a first supporting plate 122. The first bottom plate 121 may be a flat plate structure, or may be a U-shaped structure or other structures. The first supporting plate 122 may be disposed on the first bottom plate 121 and may be detachably connected to the first bottom plate 121 by snapping or using a screw connection or the like. The transverse detector 4 may be laid on the first supporting plate 122 and fixed on the first supporting plate 122 by snapping or by bolting or the like. Of course, the first mounting assembly 12 may also be just a flat plate.

A plurality of transverse detectors 4 may also be mounted on the second mounting assembly 13 and may move in or out of the casing 11 from the second end 116 of the casing 11. For example, the second mounting assembly 13 may include a second bottom plate 131 and a second supporting plate 132 detachably connected to the second bottom plate 131. The plurality of transverse detectors 4 may also be laid on the second supporting plate 132. The specific structure of the second mounting assembly 13 may refer to the first mounting assembly 12 described above, which will not be described in detail. Of course, the second mounting assembly 13 may also be a flat plate.

Furthermore, an end of the second mounting assembly 13 within the casing 11 may directly face an end of the first mounting assembly 12 within the casing 11 to prevent the first mounting assembly 12 and the second mounting assembly 13 from overlapping. Each of lengths of the first mounting assembly 12 and the second mounting assembly 13 may be equal to or less than half of the longitudinal length of the casing 11, so that the first mounting assembly 12 and the second mounting assembly 13 may be accommodated simultaneously in the casing 11.

As shown in FIG. 4, in an embodiment, the transverse detector arm 1 may further include a first end cover 14 and a second end cover 15, wherein:

The first end cover 14 may be a plate-like structure, which is sized to cover the first end 115, and may be detachably sealingly connected to the first end 115 of the casing 11 by snapping or by bolting or the like. The first end 115 of the casing 11 is covered to prevent moisture or impurities from entering the casing 11 from the first end 115, which is beneficial to protect the transverse detector 4 in the casing 11. When the transverse detector 4 needs to be inspected, the first end cover 24 may be separated from the first end 115 so as to take the first mounting assembly 12 and the detector thereon out.

The second end cover 15 may be detachably sealingly connected to the second end 116 of the casing 11 to cover the second end 116 of the casing 11, so as to prevent moisture or impurities from entering the casing 11 from the second end 116. For the structure and mounting of the second end cover 15, reference may be made to the first end cover 14 and mounting of the first end cover 14 and the first end 115, which will not be described in detail herein.

Figure 6:
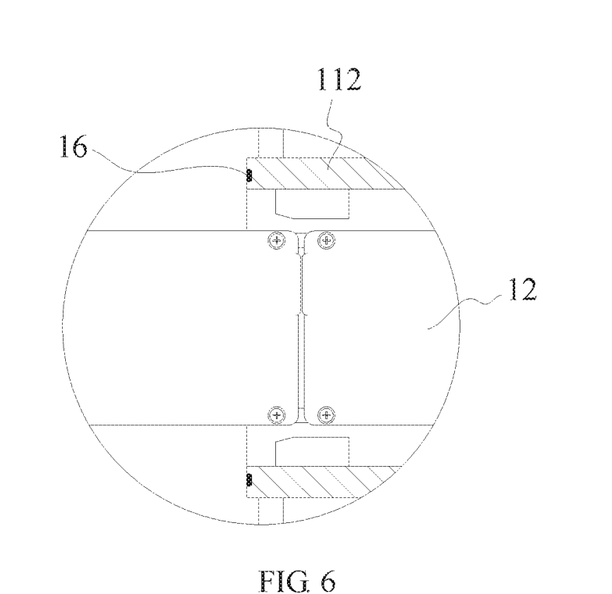
FIG. 6 is an enlarged view of portion C in FIG. 4.
Figure 7:
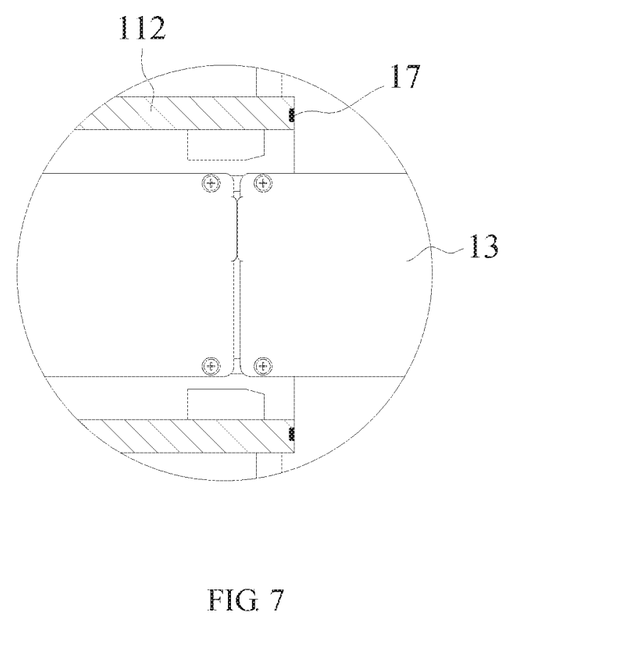
FIG. 7 is an enlarged view of portion D in FIG. 4.

As shown in FIGS. 5-7, in an embodiment, the transverse detector arm 1 may further include a first sealing ring 16 and a second sealing ring 17, wherein:

As shown in FIG. 5 and FIG. 6, the first sealing ring 16 may be an annular structure, and may be disposed at the end surface of the first end 115 and fixedly connected with the first end 115 by bonding or snapping. The one end cover 14 may be attached to the first sealing ring 16, so that the sealing effect of the first end cover 14 and the first end 115 may be improved by the first sealing ring 16, thereby further preventing impurities or moisture from entering the casing 11. Of course, the first sealing ring 16 may also be disposed at the first end cover 14 as long as the first end cover 14 and the first end 115 can be sealed.

As shown in FIG. 7, the second sealing ring 17 may be disposed at the end surface of the second end 116. The structure and mounting of the second sealing ring 17 may refer to that of the first sealing ring 16, which will not be described in detail herein. Thus, the sealing effect of the second end cover 15 and the second end 116 may be improved by the second seal ring 17, thereby further preventing impurities or moisture from entering the casing 11. Of course, the second sealing ring 17 may also be disposed at the second end cover 15 as long as the second end cover 15 and the second end 116 may be sealed.

As shown in FIG. 1, in an embodiment, the number of vertical detector arms 2 may be two, and two vertical detector arms 2 may be vertically disposed at both ends of the transverse detector arm 1 to form a passage through which the vehicle 8 to pass. These two vertical detector arms 2 may be fixed to the upper surface of the transverse detector arm 1 by welding, snapping or bolting, or may be fixed on the ground. The shape of the cross section of each vertical detector arms 2 may be rectangular, circular or trapezoidal, etc., and will not be described herein.

As shown in FIG. 1, in an embodiment, the radiation source 3 may be an X radiation source, a y radiation source, or other radiation devices which emits ray that is permeable to the vehicle 8. At the same time, the radiation source 3 may be disposed above the transverse detector arm 1 and above a channel between two vertical detector arms 2, and may emit ray downwards. Two vertical detector arms 2 may be symmetric about the radiation source 3, and a center point of the radiation source 3 is located on the midperpendicular plane of the transverse detector arm 1. In order to facilitate mounting the radiation source 3, a top beam 6 parallel to the transverse detector arm 1 may be built at the top of two vertical detector arms 2, and the top beam 6 and the vertical detector arm 2 may be fixedly connected by for example welding, bolting or the like, and may also be an integrated structure, so that it may form a gantry with the vertical detector arm 2. The radiation source 3 may be fixed to the middle of the top beam 6 by welding, snapping, bolting or the like, and may emit ray downwards. Of course, in other embodiments of the present disclosure, the radiation source 3 may also be built over the channel by a specialized bracket.

As shown in FIG. 1, in an embodiment, the transverse detector 4 matches with the radiation source 3 and receives ray from the radiation source 3 to form a detection area for detecting the vehicle 8 entering the detection area and forming an image of interior of the vehicle 8. For example, if the radiation source 3 is an X radiation source, the transverse detector 4 is an X-ray detector; if the radiation source 3 is a gamma radiation source, the transverse detector 4 is a y-ray detector. The specific structure and working principle of the transverse detector 4 may refer to the existing detector, and will not be described in detail herein.

The number of transverse detectors 4 may be plural, and the specific number is not particularly limited herein. The plurality of transverse detectors 4 are each fixed to the mounting plate of the transverse detector arm 1 by welding, snapping, bolting or the like. For example, the plurality of transverse detectors 4 may be respectively disposed on the first mounting assembly 12 and the second mounting assembly 13, and may be fixed by bolts. When the first mounting assembly 12 and the second mounting assembly 13 are located in the casing 11, each of transverse detectors 4 may be laid along the length direction of the casing 11, i.e. the horizontal direction, without tilting. Compared to centripetal distribution, the laying is advantageous to reduce a thickness of the transverse detector arm 1, and may reduce or even avoid the construction work of mounting the transverse detector arm 1. At the same time, each of the transverse detectors 4 may form a detection area with the radiation source 3, and the detection area formed by each of transverse detectors 4 may form a continuous sub-detection surface through which the vehicle 8 may pass to be detected.

As shown in FIG. 1, in an embodiment, the type of the vertical detector 5 may refer to the above-mentioned transverse detector 4, which may also receive ray from the radiation source 3, which will not be described in detail herein. The number of vertical detectors 5 may be plural, and the plurality of vertical detectors 5 may be respectively disposed on the two vertical detector arms 2 and may be distributed in a vertical direction. Each vertical detector 5 may be fixedly connected with the vertical detector arm 2 by snapping, welding, bolting or the like, and vertical detectors 5 on the two vertical detector arms 2 may be symmetrically arranged.

Each of vertical detectors 5 is disposed towards the center point of the radiation source 3, i.e., is centripetally disposed, and the midperpendiculars of vertical detectors 5 intersect at the center point of the radiation source 3 in order to receive ray emitted by the radiation source 3. Each vertical detector 5 may form a detection area with the radiation source 3, and detection areas formed by vertical detectors 5 of the same vertical detector arm 2 may form a continuous sub-detection surface; sub-detection surfaces formed by vertical detectors 5 of the two vertical detector arms 2 may be located at both sides of the sub-detection surface formed by the transverse detector 4, and together form a continuous detection surface, so that the vehicle 8 passing through the channel may be detected by the detection surface to obtain an image of the interior of the vehicle 8. Since the vertical detectors 5 are all disposed centripetally towards the center point of the radiation source 3, the vertical detectors 5 are inclined with respect to the horizontal plane, so that the area of the vertical detector 5 occupied in the horizontal direction is reduced and it is advantageous to reduce the thickness of the vertical detector arm 2 to save material and reduce cost. At the same time, since the continuous detection surface may avoid a detection dead zone that cannot be scanned, reliability of the detection result is improved.

As shown in FIG. 2 to FIG. 4, in an embodiment, the vehicle detection system may further include a joint 7 which may be disposed on the first end cover 14 or the second end cover 15 to guide leads of the transverse detector 4 and the vertical detector 5.

In an embodiment, the vehicle detection system may further include a control device and a display device, and both the transverse detector 4 and the vertical detector 5 may be connected to the control device so as to process the collected signals through the control device and control the display device to display an image of the interior of the vehicle 8. Of course, the vehicle detection system may also include other devices, and may refer to the existing vehicle detection system, which will not be described in detail herein.

In the vehicle detecting system of the embodiment of the present disclosure, transverse detectors 4 in the transverse detector arm 1 are laid. The vertical detectors 5 are distributed in the vertical direction on the vertical detector arm 2, and are both disposed towards the center point of the radiation source 3, i.e., are centripetally arranged; at the time of detection, the vehicle 8 may pass from the transverse detector arm 1 and pass through the channel between two vertical detector arms 2, and the plurality of transverse detectors 4 and the plurality of vertical detectors 5 cooperate to form clear images of the vehicle 8 to be detected and its interior to ensure reliability of detection of the vehicle 8. The plurality of transverse detectors 4 may be laid on the transverse detector arm 1 along the length direction of the transverse detector arm 1. Compared to the centripetal distribution, its space occupied in the vertical direction may be reduced, which is advantageous to reduce the thickness and weight of the transverse detector arm 1 and to reduce or even eliminate the amount of construction work required to bury the transverse detector arm 1.

As can be seen from the above technical solutions, the present disclosure has at least one of the following advantages and positive effects:

In the vehicle detection system of the present disclosure, the plurality of transverse detectors may be laid on the transverse detector arm, which may reduce space occupied in the vertical direction compared to the conventional centripetal arrangement, and may be advantageous to reduce the thickness of the transverse detector arm, and thereby to reduce or even eliminate the amount of construction work required to bury the transverse detector arm.

The transverse detectors in the transverse detector arms are laid, and the vertical detectors are distributed in the vertical direction on the vertical detector arms, and are all disposed towards the center point of the radiation source, i.e., are disposed centripetally. The plurality of transverse detectors and the plurality of vertical detectors cooperate to form clear images of the vehicle to be detected and its interior to ensure reliability of detection of the vehicle.

It should be understood that the present disclosure does not limit its application to the detailed structure and arrangement of the components mentioned in the specification. The present disclosure is capable of having other embodiments, and is capable of implementing and performing various embodiments. The foregoing variations and modifications are intended to fall within the scope of the present disclosure. It should be understood that the present disclosure disclosed and defined herein extends to all alternative combinations of two or more individual features that are mentioned or apparent in the text or drawings. All of these different combinations constitute various alternative aspects of the present disclosure. The embodiments described in the specification illustrate the best mode of the present disclosure, and will enable those skilled in the art to utilize the present disclosure.

What is claimed is:

1. A vehicle detection system, comprising:
   a transverse detector arm capable of being disposed on the ground;
   two vertical detector arms disposed at both ends of the transverse detector arm;
   a radiation source located above the transverse detector arm;
   a plurality of transverse detectors disposed within the transverse detector arm and laid along a length direction of the transverse detector arm for receiving a ray emitted by the radiation source; and
   a plurality of vertical detectors symmetrically disposed on the two vertical detector arms, each of the vertical detectors being disposed towards a center point of the radiation source for receiving ray emitted by the radiation source,
   wherein each angle between a mounting surface of each of the transverse detectors and a mounting surface of the transverse detector arm is 0 degree.

2. The vehicle detection system according to claim 1, wherein the transverse detector arm is laid on a surface of the ground.

3. The vehicle detection system according to claim 2, wherein midperpendicular planes of the vertical detectors intersect at the center point of the radiation source.

4. The vehicle detection system according to claim 1, wherein a midperpendicular plane of the transverse detector arm passes through a center point of the radiation source.

5. The vehicle detection system according to claim 4, wherein midperpendicular planes of the vertical detectors intersect at the center point of the radiation source.

6. The vehicle detection system according to claim 1, wherein midperpendicular planes of the vertical detectors intersect at the center point of the radiation source.

7. The vehicle detection system according to claim 1, wherein the transverse detector arm comprises:
   a casing presenting a tubular structure and having a first end and a second end; and
   a mounting plate horizontally disposed within the casing and capable of moving in or out along a length direction of the casing, the plurality of transverse detectors being disposed on the mounting plate.

8. The vehicle detection system according to claim 7, wherein the transverse detector arm further comprises:
   a first end cover detachably connected to the first end; and
   a second end cover detachably connected to the second end.

9. The vehicle detection system according to claim 8, wherein the transverse detector arm further comprises:
   a first sealing ring disposed at an end surface of the first end or the first end cover for sealingly connecting the first end cover with the first end; and
   a second sealing ring disposed at an end surface of the second end or the second end cover for sealingly connecting the second end cover with the second end.

10. The vehicle detection system according to claim 9, wherein the mounting plate comprises:
    a first mounting assembly disposed within the casing and capable of moving in or out of the first end; and
    a second mounting assembly disposed within the casing and directly facing the first mounting assembly, and capable of moving in or out of the second end; and
    wherein the plurality of transverse detectors are respectively disposed on the first mounting assembly and the second mounting assembly.

11. The vehicle detection system according to claim 9, wherein the mounting plate comprises:
    a first mounting assembly disposed within the casing and capable of moving in or out of the first end, the first end cover being connected to one end of the first mounting assembly; and
    a second mounting assembly disposed within the casing and directly facing the first mounting assembly, and capable of moving in or out of the second end, the second end cover being connected to one end of the second mounting assembly;
    wherein the plurality of transverse detectors are respectively disposed on the first mounting assembly and the second mounting assembly.

12. The vehicle detection system according to claim 8, wherein the mounting plate comprises:
    a first mounting assembly disposed within the casing and capable of moving in or out of the first end; and
    a second mounting assembly disposed within the casing and directly facing the first mounting assembly, and capable of moving in or out of the second end; and
    wherein the plurality of transverse detectors are respectively disposed on the first mounting assembly and the second mounting assembly.

13. The vehicle detection system according to claim 8, wherein the mounting plate comprises:
    a first mounting assembly disposed within the casing and capable of moving in or out of the first end, the first end cover being connected to one end of the first mounting assembly; and
    a second mounting assembly disposed within the casing and directly facing the first mounting assembly, and capable of moving in or out of the second end, the second end cover being connected to one end of the second mounting assembly;

wherein the plurality of transverse detectors are respectively disposed on the first mounting assembly and the second mounting assembly.

14. The vehicle detection system according to claim 7, wherein the casing comprises a lower casing and an upper casing each having a U-shaped cross section, the upper casing and the lower casing being oppositely engaged and sealingly connected.

15. The vehicle detection system according to claim 14, wherein the mounting plate comprises:
a first mounting assembly disposed within the casing and capable of moving in or out of the first end; and
a second mounting assembly disposed within the casing and directly facing the first mounting assembly, and capable of moving in or out of the second end; and
wherein the plurality of transverse detectors are respectively disposed on the first mounting assembly and the second mounting assembly.

16. The vehicle detection system according to claim 14, wherein the first mounting assembly comprises a first bottom plate and a first supporting plate detachably connected to the first bottom plate; the second mounting assembly comprises a second bottom plate and a second supporting plate detachably connected to the second bottom plate; and the plurality of transverse detectors are respectively disposed on the first supporting plate and the second supporting plate.

17. The vehicle detection system according to claim 7, wherein the casing is provided with a plurality of outwardly extending connecting lugs, each of the connecting lugs being provided with a mounting hole.

18. The vehicle detection system according to claim 17, wherein the mounting plate comprises:
a first mounting assembly disposed within the casing and capable of moving in or out of the first end; and
a second mounting assembly disposed within the casing and directly facing the first mounting assembly, and capable of moving in or out of the second end; and
wherein the plurality of transverse detectors are respectively disposed on the first mounting assembly and the second mounting assembly.

19. The vehicle detection system according to claim 17, wherein the first mounting assembly comprises a first bottom plate and a first supporting plate detachably connected to the first bottom plate; the second mounting assembly comprises a second bottom plate and a second supporting plate detachably connected to the second bottom plate; and the plurality of transverse detectors are respectively disposed on the first supporting plate and the second supporting plate.

20. The vehicle detection system according to claim 7, wherein the mounting plate comprises:
a first mounting assembly disposed within the casing and capable of moving in or out of the first end; and
a second mounting assembly disposed within the casing and directly facing the first mounting assembly, and capable of moving in or out of the second end; and
wherein the plurality of transverse detectors are respectively disposed on the first mounting assembly and the second mounting assembly.

* * * * *